United States Patent Office 3,133,791
Patented May 19, 1964

3,133,791
METHOD OF SLUDGE INHIBITION IN PHOSPHORIC ACID
Roger D. Laib and Lou Cornelia Key, Cincinnati, Ohio, assignors to National Distillers and Chemical Corporation, New York, N.Y., a corporation of Virginia
No Drawing. Filed June 14, 1961, Ser. No. 116,931
5 Claims. (Cl. 23—165)

This invention relates to the production of wet process phosphoric acid which is resistant to the formation of insoluble phosphatic residues during production and storage. More particularly, it relates to the pretreatment of the phosphate rock feed material for the removal of iron impurities.

In general, commercial phosphoric acid is produced by the so-called "wet process," which comprises the acidulation of phosphate rock with an inorganic acid such as sulfuric acid and mixtures thereof with dilute phosphoric acid. A serious problem associated with the production and storage of wet process phosphoric acid and liquid fertilizer made therefrom has been the formation and settling of an insoluble phosphatic sludge. Such sludge, even if removed as formed, may continue to form for up to several weeks following production of the phosphoric acid. This sludge apparently comprises a complex phosphate of iron and aluminum. The formation of this sludge is costly both in terms of the handling problem resulting from the clogging of transfer and storage equipment as well as in the loss of active $P_2O_5$.

Since commercially available phosphate rock sources contain both iron and aluminum as major impurities, deleterious phosphatic sludge formation takes place during production and storage of the phosphoric acid. The prior art processes have generally dealt with this problem by removing impurities such as iron and aluminum from wet process phosphoric acid subsequent to its production from phosphate rock. In general, these processes involve the use of acid to dissolve the impurities, and the use of relatively costly ion exchange resins or filtration equipment to remove the impurities from a dissolved or precipitated state. Furthermore, these prior art processes are devised to remove, in addition to iron, other materials which were considered to promote phosphatic sludge formation.

The present invention is, therefore, primarily concerned with the overcoming of the technical and economic disadvantages of the prior art processes, and to make possible the production from crude phosphate rock of wet process phosphoric acid which is stable against phosphatic sludge formation. A particular object of the invention is to provide a process which will enable the production of phosphoric acid, stable to phosphatic sludge formation, directly from a phosphate rock so treated as to obviate the need for intermediate stabilization of the phosphoric acid product. A more particular object is to provide a process which will enable the production of substantially iron-free phosphoric acid directly from a phosphate rock. A further and specific object is to provide a process for the efficient and economical removal of iron impurities from crude phosphate rock. These and other objects of the invention will become apparent from the ensunig description of the invention.

In accordance with the present invention, it has now been found that phosphate rock suitable for acidulation with sulfuric acid to a substantially iron-free, stable phosphoric acid can be produced by initially contacting the crude, commercial phosphate rock, at elevated temperatures, with a gaseous mixture comprising a major proportion of hydrogen chloride and a minor proportion of chlorine, so as to convert the iron impurities in the phosphate rock to a volatile form, and thereafter remove said gaseous mixture along with the volatile iron impurities from the reaction zone. It has also been found that only the iron impurities need to be reduced below contaminating levels in order to avoid the formation of the deleterious phosphatic sludge.

In carrying out the process of this invention, the crude phosphate rock feed is preferably first ground to a fine particle size by any of the techniques well-known to the art. The particles are then suitably positioned in a flat or columnar bed. An alternate technique is to suspend the particles in a rapid flowing gaseous fluid, said fluid comprising either a gas inert to reaction with phosphates or the chlorinating gas under the conditions of the reaction or the chlorinating gas itself. Examples of operable inert gases are nitrogen, argon, etc. Where a solid bed technique is employed, a suitable conventional method of continuously introducing fresh rock contact surfaces during the reaction may be employed, e.g., by tumbling or vibrating the particles.

The phosphate rock particles are brought to reaction temperature either by preheating or through contact with inert or reactant gases. An unexpected and significant increase in reaction rate has been noted when the rock particles are preheated for a period of time at an elevated temperature prior to contact with the chlorinating gas mixture at reaction temperatures.

The chlorinating gas mixture is brought to reaction temperature either by preheating or through contact with preheated rock particles. Intimate contact is established within a preferred temperature range, between the chlorinating gas mixture and the surfaces of the phosphate rock particles for such a period of time as to effect volatilization of a substantial portion of the iron impurities in the rock. Such intimate contact may be achieved by passing the chlorinating gas mixture through the rock particles at atmospheric pressure. The degree of contact has been found to improve with elevated pressure and an increase in the concentration of the chlorinating gas mixture in the atmosphere surrounding the particles. The reaction temperature may, in part, be maintained by the heat given off from the exothermic reaction between the impure phosphate rock and the chlorinating gases. However, some external heating is generally desirable.

The iron-containing gaseous mixture produced in the chlorination reaction is then passed out of or otherwise removed from the reaction zone. It is possible to separate the volatile iron impurities from the recovered chlorinating gas mixture by methods known to the art, such as by condensation or by scrubbing with a chlorinated hydrocarbon. The purified chlorinating gas mixture may then be recycled to the reaction zone.

This process is operable for any of the commercially available phosphate rocks. An analysis of a phosphate rock, which is typical of those suitable for the practice of this invention is set forth below.

| Component: | Wt. percent |
|---|---|
| $P_2O_5$ | 34.5 |
| CaO | 48.4 |
| Fe | 0.5 |
| Al | 0.8 |
| F | 4.3 |

Phosphate rock wherein the particle size has been reduced so that about 90% of the particles pass a No. 100 mesh is especially preferred to facilitate contact of the phosphate rock with the chlorinating gas mixture. In general, it is preferred to employ rock particles having an average particle size of about 100 to 300 mesh, although larger particles may be used if greater contact times are desired. For rock particles in the preferred range of subdivision, a contact time of the iron-free chlorinating gas mixture with untreated phosphate rock of about 60 minutes or less, preferably about 30 to 45 minutes, is generally sufficient to reduce the iron content of the rock below the level from which unstable wet process acid would result. However, longer contact times, for example, up to about three hours, may be employed advantageously.

The chlorination reaction may be carried out from about 400° C. to 1000° C. Below 400° C., the reaction proceeds at a slow and uneconomical rate; above 1000° C., there is no significant increase in reaction rate. The preferred range is from about 600° C. to 800° C.

The chlorinating gas mixture comprises a major portion of hydrogen chloride and a minor portion of chlorine. More specifically, the mixture comprises from 51 to 99.5 mole percent of hydrogen chloride and from 0.5 to 49 mole percent chlorine. At greater or lesser percentages of hydrogen chloride, the reaction rate falls off. Preferably, the mixture comprises from about 70 to about 99 mole percent hydrogen chloride and from about 1 to 30 mole percent of chlorine.

As noted above, it has been further found that a sharp increase in reaction rate occurs when the phosphate rock has been maintained for a period of more than about one-half hour, and preferably from about one to three hours, at a temperature of above about 900° C., and preferably at a temperature from about 1000° C. to 1200° C., prior to contacting with the chlorinating gas mixture.

The flow rate of the chlorinating gas mixture over the phosphate rock particles is not critical to the process of this invention. As the flow rate increases, however, the rate of contact of the rock particles with fresh chlorinating gas mixture does increase thereby improving the reaction rate.

The novel process of this invention may be carried out in either a batchwise or continuous manner. For example, in a batchwise operation the chlorinating gas mixture may be passed into a reactor charged with phosphate rock, allowed sufficient time to react and reduce the iron content of the rock to a given level, and then removed from the reactor. Alternatively, in a continuous operation the chlorinating gas mixture may be passed into the reaction zone countercurrently to the phosphate rock so that phosphate rock of gradually decreasing iron content is contacted with a successively purer gas mixture.

In general, it is advantageous to reduce the amount of iron in the phosphate feed to a level such that the combined amounts of iron and aluminum do not exceed about 1.0 weight percent, and preferably, do not exceed about 0.95 weight percent, based on the weight of the phosphate rock. It will be understood, however, that the removal of only major amounts of the iron is also contemplated, since either the avoidance or substantial inhibition of phosphatic sludge formation would be useful in this field.

The invention will be more fully understood by reference to the following illustrative examples.

EXAMPLE I

Approximately 2 grams of Florida phosphate rock, containing approximately 0.5 wt. percent iron and 0.8 wt. percent aluminum and ground to 90% passing 100 mesh, was placed into a 4 inch porcelain boat. This boat was in turn inserted into the end of a Vycor tube, 1 inch in diameter by 12 inches long, the center portion of this tube being encased in the tube of an electrically heated furnace. The temperature of the furnace was raised to 400° C., and the boat pushed into the heated portion of the Vycor tube. Then, a cork stopper through which a gas entry tube was inserted, was plugged into one end of the Vycor tube, and the desired gas mixture passed from a cylinder through a sulfuric acid scrubber into the Vycor tube. The temperature of the furnace was raised gradually over a period of about three hours to 800° C. At periodic intervals, samples of phosphate rock were removed from the porcelain boat and analyzed by emission spectroscopy for weight percentages of iron and aluminum.

Table I shows the results of a series of runs performed at various compositions of gas feed. Samples were taken at 100° C. intervals using each of the different gas feed compositions.

Table I

| Sampling Temp., °C. | Composition of HCl/Cl₂ Feed Gas in Mole Percent HCl | | | | | | | | | | | |
|---|---|---|---|---|---|---|---|---|---|---|---|---|
| | 50 | | 75 | | 90 | | 95 | | 99.5 | | 100 | |
| | Fe, percent | Al, percent | Fe, percent | Al, percent | Fe, percent | Al, percent | Fe, percent | Al, percent | Fe, percent | Al, percent | Fe, percent | Al, percent |
| 400 | 0.50 | 0.8 | 0.50 | 0.8 | 0.50 | 0.8 | 0.50 | 0.8 | 0.50 | 0.8 | 0.50 | 0.8 |
| 500 | 0.50 | 0.8 | 0.38 | 0.8 | 0.50 | 0.8 | 0.50 | 0.8 | 0.50 | 0.8 | 0.50 | 0.8 |
| 600 | 0.50 | 0.8 | 0.33 | 0.8 | 0.30 | 0.8 | 0.45 | 0.8 | 0.50 | 0.8 | 0.50 | 0.8 |
| 700 | 0.40 | 0.8 | 0.22 | 0.8 | 0.11 | 0.8 | 0.08 | 0.8 | 0.17 | 0.8 | 0.40 | 0.8 |
| 800 | | | 0.06 | 0.8 | 0.02 | 0.8 | 0.02 | 0.8 | 0.03 | 0.8 | 0.12 | 0.8 |

EXAMPLE II

The procedure of Example I was followed with a 95/5 HCl/Cl₂ mixture except that the phosphate rock was maintained at 1000° C. for two hours prior to being contacted with the gaseous mixture. Table II shows the results of these runs along with comparative runs carried out without the preheating treatment.

Table II

| Reaction time, minutes | 600° C. | | 700° C. | |
|---|---|---|---|---|
| | Preheated Fe, percent | Not preheated Fe, percent | Preheated Fe, percent | Not preheated Fe, percent |
| 5 | 0.50 | 0.50 | 0.46 | 0.50 |
| 10 | 0.33 | 0.50 | 0.26 | 0.47 |
| 15 | 0.27 | 0.50 | 0.20 | 0.41 |
| 30 | 0.20 | 0.43 | 0.19 | 0.35 |
| 45 | 0.20 | 0.39 | 0.17 | 0.30 |
| 60 | 0.20 | 0.38 | 0.15 | 0.15 |

Thus, it is seen that preheating the phosphate rock prior to its contact with the chlorinating gas mixture greatly increases the rate at which iron is removed from the phosphate rock.

EXAMPLE III

A sample of Florida phosphate rock, analyzing 0.5 wt. percent iron and 0.8 wt. percent aluminum was ground so that 90% of the resulting particles passed a No. 100 mesh, and treated by the aforedescribed process with a gaseous mixture comprising 95 mole percent HCl and 5 mole percent Cl₂ for 60 minutes at 700° C. The resultant product contained .15 wt. percent iron and 0.8 wt. percent aluminum. 500 g. of this treated rock was slurried in a mixture of 840 grams of 50% sulfuric acid and 700 grams H₃PO₄ (26% P₂O₅). The temperature of the resulting reaction mixture rose to about 80° C. and was maintained at this level for one hour. The reaction product mixture was then allowed to cool to about 50° C., and filtered. The filtrate was a "wet process" phosphoric acid exhibiting a density of about 1.4° Bé. and containing a total of 32 wt. percent of P₂O₅. This recovered acid was then concentrated by evaporation to an acid containing from 50 to 55% $P_2O_5$. A sample of this concentrated acid was allowed to stand undisturbed for four weeks at room temperature. During this period, the acid remained clear with negligible formation of sludge.

EXAMPLE IV

A sample of the Florida phosphate rock used in Example III, but not submitted to the present pretreatment method to reduce the iron content, was employed as in Example III to make a "wet process" phosphoric acid having a density of 1.4° Bé. and containing a total of 32 wt. percent of $P_2O_5$. The resulting phosphoric acid, upon standing, immediately began to precipitate a sludge, and it continued to form additional sludge for over four weeks.

While there are above disclosed but a limited number of embodiments of the invention presented herein, it is possible to produce still other embodiments without departing from the broader aspects of the inventive concept.

What is claimed is:

1. A method for inhibiting sludge formation in phosphoric acid obtained by the acidulation of phosphate rock with sulfuric acid, which comprises the following sequential steps:
   (a) preheating phosphate rock, having an average particle size of less than about 100 mesh, to a temperature greater than about 900° C. for at least 30 minutes;
   (b) reacting the preheated phosphate rock particles with a gaseous mixture, comprising about 51 to 99.5 mole percent hydrogen chloride and about 0.5 to 49 mole percent chlorine, at a temperature of about 400° to 1000° C. for at least 15 minutes to obtain phosphate rock particles having a substantially reduced iron content and a combined amount of iron and aluminum which is less than about 1% by weight; and
   (c) acidulating the thus threated phosphate rock particles with sulfuric acid to obtain stable phosphoric acid.

2. The method of claim 1 wherein said preheating is carried out at a temperature within the range of about 1000 to 1200° C.

3. The method of claim 1 wherein said preheating is carried out for a time period within the range of about 1 to 3 hours.

4. The method of claim 1 wherein said reaction of the preheated phosphate rock particles with the gaseous mixture is carried out at a temperature within the range of about 600° to 800° C.

5. The method of claim 1 wherein said acidulation is carried out with a mixture of sulfuric acid and phosphoric acid.

References Cited in the file of this patent
UNITED STATES PATENTS

| | | |
|---|---|---|
| 2,629,650 | Dupont et al. | Feb. 24, 1953 |
| 2,777,755 | Eberhardt | Jan. 15, 1957 |